UNITED STATES PATENT OFFICE.

PAUL R. HERSHMAN, OF CHICAGO, ILLINOIS, ASSIGNOR TO THE MINERAL PRODUCTS COMPANY, OF NEW YORK, N. Y., A CORPORATION OF WEST VIRGINIA.

PRODUCTION OF REFRACTORY MATERIALS.

1,197,626.     Specification of Letters Patent.     Patented Sept. 12, 1916.

No Drawing. Application filed December 21, 1914, Serial No. 878,313. Renewed February 4, 1916. Serial No. 76,227.

*To all whom it may concern:*

Be it known that I, PAUL R. HERSHMAN, a subject of the Empire of Austria-Hungary, residing in the city of Chicago, county of Cook, State of Illinois, have invented certain new and useful Improvements in Production of Refractory Materials; and I do hereby declare the following to be a full, clear, and exact description of the invention, such as will enable others skilled in the art to which it appertains to make and use the same.

My invention relates to the production of heat-resisting materials, such as linings for furnaces, and, more particularly, refractory bricks for metallurgical and other purposes.

The heat-resisting material (whether furnace lining or refractory brick, produced in accordance with my invention contains aluminum and carbon, the carbon present being in proportion less than that required for converting the metal into aluminum carbid. In some instances, the aluminiferous material employed in the manufacture of the product may be, for instance, what is known as aluminum dust, that is to say, fine particles of aluminum obtained from the grinding or burring of aluminum in workshop operations, and which consists in part, of filings, shavings, and the like, and which may incidentally contain a certain lesser amount of like particles of copper, iron, etc. This material, which usually contains as high as from 80-95% of metallic aluminum is relatively cheap as compared with the pure metal and, for that reason, is more available commercially for the purpose than the pure metal itself. Another and the preferred source of the aluminiferous ingredient of the product is aluminum oxid, that is to say, alumina, and, preferably calcined alunite, (substantially deprived of its alkali content) which I have found particularly adapted for the purpose. Aluminum oxid is a still cheaper product than the aluminum dust hereinbefore referred to and has certain specific advantages which will be hereinafter pointed out.

Whether aluminum dust, or aluminum oxid is employed, as the case may be, I prefer to briquet the aluminiferous material with an amount of carbon insufficient to convert the alumina into aluminum carbid. The briqueting operation is effected by adding finely divided carbon (as, for instance, finely ground coke) with the aluminiferous material, together with a sufficient amount of tar or glue to serve as a binder, the mass thus formed being then briqueted in the usual way. As hereinbefore indicated, the amount of carbon represented by the finely ground coke and by the tar or other carbonaceous body employed as the binder, is taken in proportion insufficient to convert the aluminum into aluminum carbid.

The purposes of the invention will be best subserved by conducting the subsequent heating of the bricks, necessary for the manufacture of the final product, in such a manner as to avoid, as far as possible, the occurrence of particles of metallic aluminum throughout the brick. This is readily possible when alumina, and particularly calcined alunite, is the aluminiferous material employed. In such case, I add to the alumina, 10%–30% of its weight of finely ground coke, together with the quantity of tar required as a binder, and, after briqueting the mass, I subject the briquet to a slow distillation, raising it in temperature gradually up to about 600° C. until it has parted with its volatile hydrocarbons and is substantially "dry." I then subject the briquets to a gradually increasing heat, preferably in an electric furnace, this additional heat rising by slow increments up to minimum of say 1500° C., but preferably as high as 2200° C., during a furnace treatment of six hours or more, according to the dimensions of the brick. Care should be taken not to speed up the heating operation nor to increase the degree of temperature employed other than gradually; otherwise the tendency would be toward the production of metal instead of the refractory brick desired. If the operation is carried on as described, the resultant product will be bricks of considerable density and of fairly good conductivity for heat, for which reason they are particularly adapted for service as the checker-work of regenerator furnaces in which it is of importance that the bricks should both take on and give up their heat promptly to the moving currents of air and gas traversing the checker-work. The moderate coefficient of shrinkage of the finished bricks likewise adapts them particularly well to metallurgical uses, but, more especially they are of value for the reason that they are found to withstand temperatures of and even in excess of 2200° C., without deterioration or deformation.

Where the "aluminum dust" is used as the aluminiferous material, the same relative proportion of finely ground coke may be employed, together with a binder such as tar or glue, and the briqueted material is to be heated with the same precautions as to duration of the heat and gradual increase in temperature, as hereinbefore described. In this case the final product is distinctly less dense, its structure being relatively porous throughout. So also, its resistivity to heat is inferior to that of the dense brick made from the aluminum oxid as the starting point. For certain uses, however, its porosity is a feature of advantage, and even this characteristic may be produced in the brick made from aluminum oxid by the employment of such expedients as introducing into the aluminum oxid briquet particles of straw, which would be burned out in the furnacing of the brick, or introducing into the briquet suitable carbonates which would give off their carbon dioxid during the furnacing operation.

I may say further that in heating the briquets to produce the refractory product desired, I prefer to do so in an atmosphere of gases containing practically no free oxygen, for instance, producer gas. For small outputs, it will be convenient to heat the briquets either in an electric tube furnace, that is to say a furnace consisting of a tube of carbon traversed by an electric current; or by inserting them within a receptacle heated to a high temperature by the passage of an electric current through a solid resistor traversing its interior. For larger outputs, the briquets may be raised to the desired temperature by passing heated gases through or over them while contained in a suitable furnace chamber provided for the purpose.

What I claim is:

1. The method of producing heat-resisting bodies, which comprises admixing with material capable of forming a refractory carbid a quantity of carbon insufficient to convert the entire mass of said material into carbid, and heating the mass without melting it and slowly and gradually until the desired refractory product is obtained; substantially as described.

2. The method of producing heat-resisting bodies, which comprises admixing with aluminiferous material, a quantity of carbon insufficient to convert the entire mass of aluminum into carbid, and heating the mass without melting it and slowly and gradually until the desired refractory product is obtained, said heating being effected in the presence of a non-oxidizing atmosphere; substantially as described.

3. The method of producing heat-resisting bodies, which comprises admixing with aluminiferous material, a quantity of carbon insufficient to convert the entire mass of aluminum into carbid, and heating the mass without melting it and slowly and gradually until the desired refractory product is obtained, said heating being effected in the presence of a non-oxidizing atmosphere consisting mainly of hydrocarbon gases; substantially as described.

4. The method of producing heat-resisting bodies, which comprises admixing with alumina finely divided carbon in proportion insufficient to convert the entire mass of the alumina into carbid, briqueting the mass, and heating the mass without melting it and slowly and gradually until the desired refractory product is obtained; substantially as described.

5. The method of producing heat-resisting bodies, which comprises admixing with the alumina 10%–30% by weight of finely divided carbon, briqueting the mass, and heating the mass without melting it and slowly and gradually until the desired refractory product is obtained; substantially as described.

In testimony whereof I affix my signature, in presence of two witnesses.

PAUL R. HERSHMAN.

Witnesses:
M. AMES,
M. A. BELL.